(12) United States Patent
Zhu et al.

(10) Patent No.: US 10,511,898 B2
(45) Date of Patent: Dec. 17, 2019

(54) METHOD AND APPARATUS FOR DOWNSTREAM FLOW CONTROL IN (X)GPON SYSTEM

(71) Applicant: Alcatel Lucent, Boulogne-Billancourt (FR)

(72) Inventors: Jianhua Zhu, Shanghai (CN); Chao Ze, Shanghai (CN)

(73) Assignee: Alcatel Lucent, Boulogne Billancourt (FR)

( * ) Notice: Subject to any disclaimer, the term of this patent is extended or adjusted under 35 U.S.C. 154(b) by 326 days.

(21) Appl. No.: 15/327,180

(22) PCT Filed: Jul. 29, 2015

(86) PCT No.: PCT/IB2015/001481
§ 371 (c)(1),
(2) Date: Jan. 18, 2017

(87) PCT Pub. No.: WO2016/020749
PCT Pub. Date: Feb. 11, 2016

(65) Prior Publication Data
US 2017/0171648 A1    Jun. 15, 2017

(30) Foreign Application Priority Data
Aug. 4, 2014  (CN) .......................... 2014 1 0380319

(51) Int. Cl.
*H04B 10/08* (2006.01)
*H04Q 11/00* (2006.01)
(Continued)

(52) U.S. Cl.
CPC ......... *H04Q 11/0067* (2013.01); *H04B 10/07* (2013.01); *H04J 14/0247* (2013.01);
(Continued)

(58) Field of Classification Search
CPC ....... H04Q 11/0067; H04Q 2011/0064; H04Q 2011/0079; H04B 10/07; H04J 14/0247; H04J 14/0249; H04J 14/0252
(Continued)

(56) References Cited

U.S. PATENT DOCUMENTS

2005/0058135 A1* 3/2005 Sisto ....................... H04L 47/22
370/395.2
2009/0161545 A1* 6/2009 Ho ........................ H04L 47/225
370/235
(Continued)

FOREIGN PATENT DOCUMENTS

CN            1588950 A      3/2005
CN          101080106 B     12/2010
(Continued)

OTHER PUBLICATIONS

"10-Gigabit-capable passive optical networks (XG-PON): Transmission convergence (TC) specifications; G.987.3 (Jan. 2014) <http://scholar.google.com/scholar?q=>", ITU-T Standard, International Telecommunication Union, Geneva ; CH, No. G.987.3 (Jan. 2014), Jan. 13, 2014 (Jan. 13, 2014), pp. 1-146, XP044008524.
(Continued)

*Primary Examiner* — Mohammad R Sedighian
(74) *Attorney, Agent, or Firm* — Harness, Dickey and Pierce, P.L.C.

(57) ABSTRACT

The invention provides a method and apparatus for downstream flow control in an (x)GPON system. First, ONU sends a DS_FlowControl_Request message to OLT, wherein the DS_FlowControl_Request message includes information of transmission inhibiting period and is used for requesting OLT to inhibit downstream transmission for a transmission inhibiting period corresponding to the information of transmission inhibiting period. After receiving the DS_FlowControl_Request message from ONU, OLT inhib-
(Continued)

its the downstream transmission for the transmission inhibiting period corresponding to the information of transmission inhibiting period based on the information of transmission inhibiting period included in the DS_FlowControl_Request message. After inhibiting the downstream transmission for the transmission inhibiting period corresponding to the information of transmission inhibiting period, OLT resumes the downstream transmission to ONU.

10 Claims, 1 Drawing Sheet

(51) Int. Cl.
 *H04B 10/07* (2013.01)
 *H04J 14/02* (2006.01)
(52) U.S. Cl.
 CPC ...... *H04J 14/0249* (2013.01); *H04J 14/0252* (2013.01); *H04Q 2011/0064* (2013.01); *H04Q 2011/0079* (2013.01)
(58) Field of Classification Search
 USPC ............... 398/70, 71, 72, 57, 66, 67, 15
 See application file for complete search history.

(56) References Cited

U.S. PATENT DOCUMENTS

| 2011/0211827 | A1* | 9/2011 | Soto | H04B 10/071 398/25 |
|---|---|---|---|---|
| 2013/0077972 | A1 | 3/2013 | Zhang et al. | |
| 2014/0362695 | A1 | 12/2014 | Ho et al. | |

FOREIGN PATENT DOCUMENTS

| CN | 101141410 B | 5/2011 | |
|---|---|---|---|
| CN | 102387085 A | 3/2012 | |
| JP | 2007-194732 A | 8/2007 | |
| WO | WO-2013/189042 A1 | 12/2013 | |
| WO | WO-2013189042 A1 * | 12/2013 | ............. H04B 10/00 |

OTHER PUBLICATIONS

Michael P. McGarry et al., "On the Reduction of ONU Upstream Buffering for PON/xDSL Hybrid Access Networks," Globecom 2013—Symposium on Selected Areas in Communications, 2013, pp. 2667-2673.

Hiroyuki Uzawa et al., "A Study of the Buffer Control Techniques to Reduce the Power Consumption of ONU," Aug. 31, 2010, p. 167.

* cited by examiner

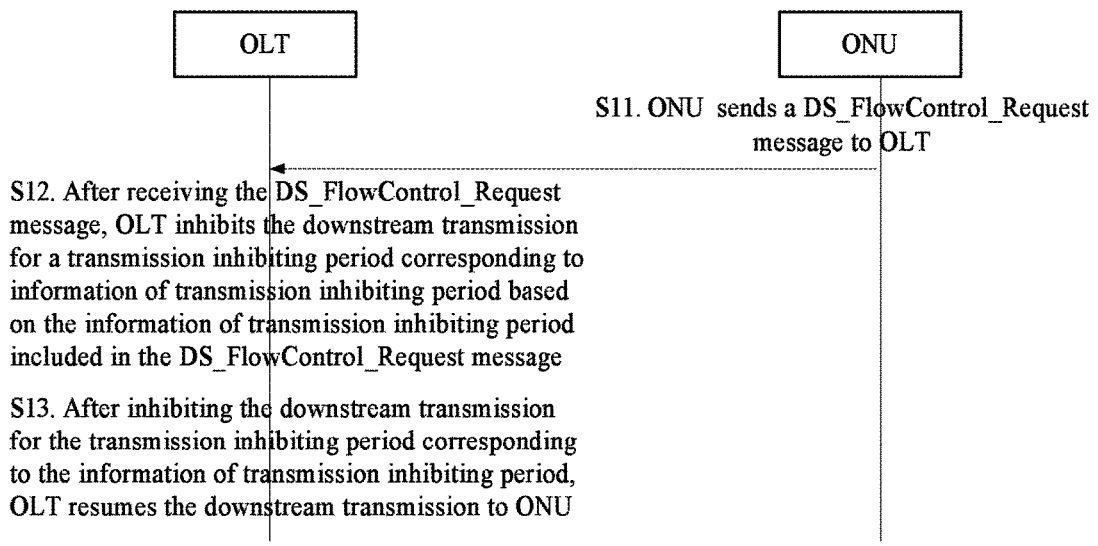

METHOD AND APPARATUS FOR DOWNSTREAM FLOW CONTROL IN (X)GPON SYSTEM

FIELD OF THE INVENTION

The present invention relates to communication systems, and particularly to a method and apparatus for downstream flow control in (x)GPON systems.

BACKGROUND OF THE INVENTION

Nowadays, in (x)GPON systems, the upstream transmission is controlled at OLT (Optical Line Terminal) side, and bandwidth is controlled via DBA (Dynamic Bandwidth Allocation) mechanism. The upstream flow control is also able to be done based on the DBA mechanism. However the downstream doesn't have corresponding flow control mechanism.

The EPON can apply the pause frame to unicast channel for flow control purpose, but (x)GPON doesn't have the similar downstream flow control mechanism yet. Without the downstream flow control in the (x)GPON system, the (x)GPON system expects the ONU (Optical Network Unit) can buffer the traffic when the congestion happens within ONU or when ONU receives the pause frame from the TINT (User Network Interface) port. Normally ONU will buffer about 100 ms for 100 Mbps UNI port (about 3 Mbytes). This will increase the requirements for the size of the memory of ONU and thus increase the power consumption of the memory of ONU.

SUMMARY OF THE INVENTION

If ONU can support downstream flow control, the smaller buffer can be applied in ONU, e.g. the buffer size can be reduced to 50 ms or even 20 ms. Therefore, some power consumption of the memory part can be saved, and this will be especially valuable for optical module with (x)GPON ONU MAC because such module is sensitive to the power consumption.

Therefore, it is desirable to provide a solution of downstream flow control in the (x)GPON system.

The basic idea of the present invention is to introduce a new message DS_FlowControl_Request), The message is sent to OLT by ONU for requesting OLT to inhibit the downstream transmission for a specified period. The specified period can be indicated by information of transmission inhibiting period included in the DS_FlowControl_Request message. After receiving the DS_FlowControl_Request message, OLT inhibits the downstream transmission for a period corresponding to the information of transmission inhibiting period.

According to one aspect of the invention, in one embodiment, there is provided a method of downstream flow control in an ONU of an (x)GPON system, the method comprising the step of: sending a DS_FlowControl_Request message to an OLT, wherein the DS_FlowControl_Request message includes information of transmission inhibiting period and is used for requesting the OLT to inhibit downstream transmission for a transmission inhibiting period corresponding to the information of transmission inhibiting period.

Advantageously, the transmission inhibiting period is not more than a predefined maximum downstream transmission inhibiting time of the OLT, For example, the predefined maximum downstream transmission inhibiting time is determined based on buffer depth of the OLT.

Advantageously, the DS_FlowControl_Request message is a PLOAM message,

Advantageously, the method further comprises the step of: for each ANI-G of the ONU, receiving a corresponding downstream flow control message from the OLT, wherein the downstream flow control message includes administrative state information corresponding to the ANI-G, for indicating enabling or disabling of flow control function of the ONU corresponding to the ANI-G; and the predefined maximum downstream transmission inhibiting time of the OLT corresponding to the ANI-G.

Advantageously, the downstream flow control message is an OMCI message.

In another embodiment, there is provided a method of downstream flow control in an OLT of an (x)GPON system, the method comprising the steps of: receiving an DS_FlowControl_Request message from an ONU, wherein the DS_FlowControl_Request message includes information of transmission inhibiting period and is used for requesting the OLT to inhibit downstream transmission for a transmission inhibiting period corresponding to the information of transmission inhibiting period; based on the information of transmission inhibiting period included in the DS_FlowControl_Request message, inhibiting downstream transmission for a transmission inhibiting period corresponding to the information of transmission inhibiting period; and after inhibiting the downstream transmission for the transmission inhibiting period corresponding to the information of transmission inhibiting period, resuming the downstream transmission to the ONU.

Advantageously, the method further comprises the step of: for each ANI-G of the ONU, sending a corresponding downstream flow control message to the ONU, wherein the downstream flow control message includes administrative state information corresponding to the ANI-G, for indicating enabling or disabling of flow control function of the ONU corresponding to the ANI-G, and the predefined maximum downstream transmission inhibiting time of the OLT corresponding to the ANI-G.

According to another aspect of the invention, in one embodiment, there is provided an apparatus for downstream flow control in an ONU of an (x)GPON system, the apparatus comprising: a first sending unit for sending a DS_FlowControl_Request message to an OLT, wherein the DS_FlowControl_Request message includes information of transmission inhibiting period and is used for requesting the OLT to inhibit downstream transmission for a transmission inhibiting period corresponding to the information of transmission inhibiting period.

Advantageously, the apparatus further comprises: a first receiving unit for receiving a corresponding downstream flow control message from the OLT for each ANI-G of the ONU, wherein the downstream flow control message includes administrative state information corresponding to the ANI-G, for indicating enabling or disabling of flow control function of the ONU corresponding to the ANI-G; and the predefined maximum downstream transmission inhibiting time of the OLT corresponding to the ANI-G.

According to another aspect of the invention, in another embodiment, there is provided an apparatus for downstream flow control in an OLT of an (x)GPON system, the apparatus comprising: a second receiving unit for receiving an DS_FlowControl_Request message from an ONU, wherein the DS_FlowControl_Request message includes information of transmission inhibiting period and is used for requesting the OLT to inhibit downstream transmission for a transmission inhibiting period corresponding to the information of transmission inhibiting period; a transmission inhibiting unit for inhibiting downstream transmission for a transmission inhibiting period corresponding to the information of transmission inhibiting period based on the information of transmission inhibiting period included in the DS_FlowControl_Request message; and a retransmission unit for resuming the downstream transmission to the ONU after inhibiting the downstream transmission for the transmission inhibiting period corresponding to the information of transmission inhibiting period.

Advantageously, the apparatus further comprises: a second sending unit for sending a corresponding downstream flow control message to the ONU for each ANI-G of the ONU, wherein the downstream flow control message includes administrative state information corresponding to the ANI-G, for indicating enabling or disabling of flow control function of the ONU corresponding to the ANI-G; and the predefined maximum downstream transmission inhibiting time of the OLT corresponding to the ANI-G.

Respective aspects of the present invention will become more apparent through the description of the embodiments below.

BRIEF DESCRIPTION OF DRAWINGS

Other features, objects and advantages of the invention will become more apparent upon review of the following detailed description of non-limiting embodiments taken with reference to the drawings in which:

FIG. 1 illustrates a flow chart of a method of downstream transmission control in the (x)GPON system according to one embodiment of the invention.

Identical or similar component (feature) will be denoted by identical or similar reference numerals throughout the drawings.

DETAILED DESCRIPTION OF EMBODIMENTS

Hereinafter, respective embodiments of the present invention will be described in details.

(x)GPON has defined power management function which has two low power modes: doze mode and sleep mode. In the doze mode, ON U receiver is on; the transmitter is off. In the sleep mode, both ON receiver and transmitter are off. From OLT point of view, the flow control mode is almost a third mode in which ONU's receiver is 'off' (i.e., can't receive packets due to congestion, not really be powered off) and transmitter is still on.

In order to achieve the purpose of the present invention, in one embodiment, a new PLOAM message (i.e., DS_FlowControl_Request) is defined, as shown in Table 1.

| Octet | Content | Description |
| --- | --- | --- |
| 1-2 | ONU-ID | |
| 3 | TBD | Message type ID "DS_FlowControl_Request". |
| 4 | 0x00 | Sequence number. Always '0'. |
| 5-6 | Time($T_{fc}$) | Unsigned integer containing the length of time for which OLT receiver inhibits downstream transmission. Actual length of time is in units of 125 microsecond. |
| 7-40 | Padding | Set to 0x00 by the transmitter; treated as "don't care" by the receiver. |
| 41-48 | MIC | Message integrity check |

In the following, the method of downstream flow control according to one embodiment of the invention will be described based on the new defined DS_FlowControl_Request message.

Referring to FIG. 1, first in step S11, ONU sends the DS_FlowControl_Request message to OLT. The DS_FlowControl_Request message includes the information of transmission inhibiting period, $T_{fc}$. The DS_FlowControl_Request message is used to request OLT to inhibit the downstream transmission for a transmission inhibiting period corresponding to the information of transmission inhibiting period.

It is to be noted that the flow control function of ONU can be configured by the administrator, who sends the corresponding message to ONU through OLT to indicate the enabling or disabling of the downstream flow control function in ONU for each ANI-G For example, for each ANI-G of ONU, OLT can send the corresponding downstream flow control messages to ONU. Each downstream flow control message includes administrative state information corresponding to an ANI-G for indicating the enabling or disabling of the downstream flow control function in ONU for this ANI-G, and the predefined maximum downstream transmission inhibiting time of OLT corresponding to this ANI-G (Iflowcontrol). The downstream flow control messages may be OMCI message, for example.

ONU can have knowledge of whether the corresponding flow control function is enabled or disabled and the predefined maximum downstream. transmission inhibiting time of OLT based on the received downstream flow control message corresponding to the respective ANI-G. The predefined maximum downstream transmission inhibiting time may be determined based on the buffer depth of OLT, for example. In one example, the predefined maximum downstream transmission inhibiting time (Iflowcontrol) may be equal to Isleep, i.e., maximum sleep interval. ONU can set the transmission inhibiting period according to the predefined maximum downstream transmission inhibiting time. For example, the transmission inhibiting period is set to be not more than the predefined maximum downstream transmission inhibiting time.

| Message ID | Message name | Function | Trigger | Effect of receipt |
| --- | --- | --- | --- | --- |
| TBD | DS_FlowControl_Request | Request OLT to inhibit the downstream transmission for a specified period. | When the occupation of ONU buffer exceeds the threshold, | When OLT receives the message, it shall inhibit the downstream transmission for a specified period. |

The format of the above DS_FlowControl_Request message is shown in table 2.

Certainly, it shall be appreciated that if the default configuration of system is that the flow control function corresponding to the respective ANI-G of each ONU is enabled by default, then the downstream flow control message does not need to include the administrative state information.

After receiving the DS_FlowControl_Request message from ONU, in step S12, OLT inhibits the downstream transmission for a transmission inhibiting period corresponding to the information of transmission inhibiting period based on the information of transmission inhibiting period included in the DS_FlowControl_Request message.

After inhibiting the downstream transmission for a transmission inhibiting period corresponding to the information of transmission inhibiting period, in step S13, OLT resumes the downstream transmission to ONU.

For example, a timer can be set in OLT. When receiving the DS_FlowControl_Request message, the timer begins to count. After the counting of the timer reaches a transmission inhibiting period corresponding to the information of transmission inhibiting period included in the DS_FlowControl_Request message, OLT returns from the current flow control status back to the previous status (i.e., the status before it goes into the flow control status, for example, awake free status), and resumes the downstream transmission to ONU.

It is to be noted that the above embodiments are just exemplary but will not limit to the present invention. Any technical solutions without departing from the spirit or essence of the invention shall fall into the protection scope of the present invention, which includes using different technical features, apparatuses and methods in different embodiments to combine so as to achieve notable effects. Moreover, any reference numerals in the claim shall not be regarded as limiting the claim; the term "comprising" will not preclude element(s) or step(s) which are not presented in other claims or specification.

The invention claimed is:

1. A method of downstream flow control in an ONU of an (x)GPON system, the method comprising:
    determining, by the ONU, a transmission inhibiting period to inhibit downstream transmission from an OLT, and
    sending a DS_FlowControl_Request message to the OLT, wherein the DS_FlowControl_Request message indicates the transmission inhibiting period determined by the ONU and requests the OLT to inhibit downstream transmission for the transmission inhibiting period,
    wherein the transmission inhibiting period is not more than a predefined maximum downstream transmission inhibiting time of the OLT, and
    wherein the predefined maximum downstream transmission inhibiting time is determined based on buffer depth of the OLT.

2. The method according to claim 1, wherein the DS_FlowControl_Request message is a PLOAM message.

3. The method according to claim 1, wherein the method further comprises:
    receiving a downstream flow control message from the OLT, wherein the downstream flow control message includes administrative state information of the ONU indicating enabling or disabling of flow control function of the ONU and indicates the predefined maximum downstream transmission inhibiting time of the OLT.

4. The method according to claim 3, wherein the downstream flow control message is an OMCI message.

5. A method of downstream flow control in an OLT of an (x)GPON system, the method comprising the steps of:
    receiving an DS_FlowControl_Request message from an ONU, wherein the DS_FlowControl_Request message indicates a transmission inhibiting period determined by the ONU and requests the OLT to inhibit downstream transmission for the transmission inhibiting period;
    based on the transmission inhibiting period indicated in the DS_FlowControl_Request message, inhibiting downstream transmission for the transmission inhibiting period;
    after inhibiting the downstream transmission for the transmission inhibiting period, resuming the downstream transmission to the ONU,
    wherein the transmission inhibiting period is not more than a predefined maximum downstream transmission inhibiting time of the OLT, and
    wherein the predefined maximum downstream transmission inhibiting time is determined based on buffer depth of the OLT.

6. The method according to claim 5, wherein the method further comprises:
    sending a downstream flow control message to the ONU, wherein the downstream flow control message includes administrative state information of the ONU indicating enabling or disabling of flow control function of the ONU and indicating a maximum downstream transmission inhibiting time of the OLT.

7. An apparatus for downstream flow control of an (x)GPON system, the apparatus comprising:
    an ONU configured to,
        determine a transmission inhibiting period to inhibit downstream transmission from an OLT, and
        send a DS_FlowControl_Request message to an OLT, wherein the DS_FlowControl_Request message indicates the transmission inhibiting period determined by the ONU and requests the OLT to inhibit downstream transmission for the transmission inhibiting period,
    wherein the transmission inhibiting period is not more than a predefined maximum downstream transmission inhibiting time of the OLT, and
    wherein the predefined maximum downstream transmission inhibiting time is determined based on buffer depth of the OLT.

8. The apparatus according to claim 7, wherein the ONU is further configured to receive a downstream flow control message from the OLT, wherein the downstream flow control message includes administrative state information of the ONU for indicating enabling or disabling of flow control function of the ONU and the predefined maximum downstream transmission inhibiting time of the OLT.

9. An apparatus for downstream flow control of an (x)GPON system, the apparatus comprising:
    an OLT configured to,
        receive an DS_FlowControl_Request message from an ONU, wherein the DS_FlowControl_Request message indicates a transmission inhibiting period determined by the ONU and requests the OLT to inhibit downstream transmission for the transmission inhibiting period,
        inhibit downstream transmission for the transmission inhibiting period included in the DS_FlowControl_Request message, and
        resume the downstream transmission to the ONU after inhibiting the downstream transmission for the transmission inhibiting period,
    wherein the transmission inhibiting period is not more than a predefined maximum downstream transmission inhibiting time of the OLT, and wherein the predefined maximum downstream transmission inhibiting time is determined based on buffer depth of the OLT.

10. The apparatus according to claim 9, wherein the OLT is further configured to send a downstream flow control message to the ONU, wherein the downstream flow control message includes administrative state information for indicating enabling or disabling of flow control function of the ONU and the predefined maximum downstream transmission inhibiting time of the OLT.

\* \* \* \* \*